Sept. 6, 1966    J. L. MITCHELL    3,270,453
COTTON BALE TAG
Filed July 13, 1964
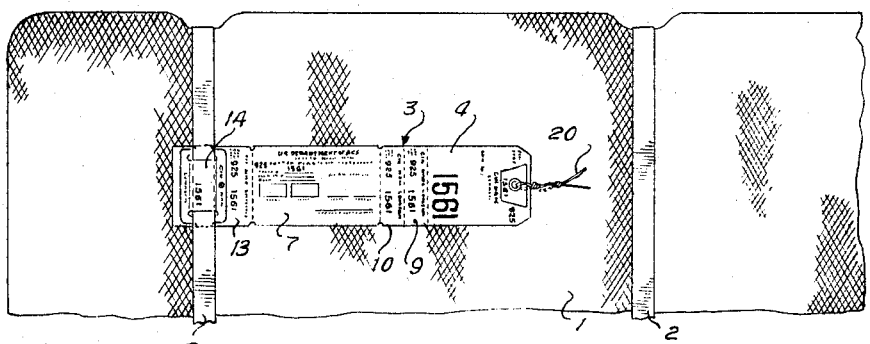
Fig. I
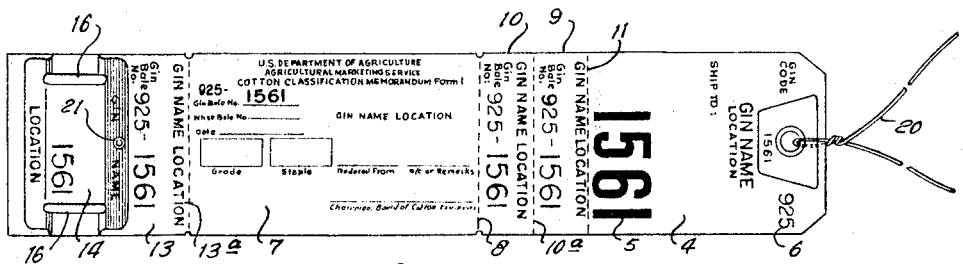
Fig. II
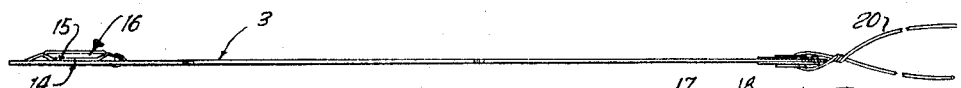
Fig. III
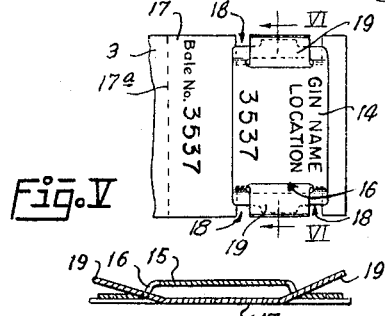
Fig. V
Fig. VI
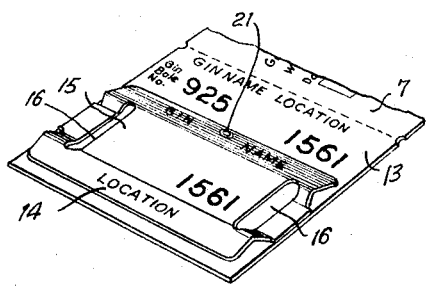
Fig. IV
INVENTOR
Joseph L. Mitchell
BY Howard E. Moore
ATTORNEY

United States Patent Office 3,270,453
Patented Sept. 6, 1966

3,270,453
COTTON BALE TAG
Joseph L. Mitchell, Mesa, Ariz., assignor to Texas Tag & Specialty Co., Wolfe City, Tex., a corporation of Texas
Filed July 13, 1964, Ser. No. 382,246
5 Claims. (Cl. 40—305)

This invention is concerned with an identification tag and is particularly concerned with an identification tag to be placed upon cotton bales having severable portions thereof with corresponding identification numbers thereon which may be separated at various stages of the processing of the cotton, and wherein means are provided for severably attaching a permanent metal identification tag to the paper or fabric tag to thereby assure that the paper tag and metal tag will have corresponding identification numbers on each bale of cotton.

It has been customary practice for many years to attach an identification tag to each bale of cotton as it is baled at the gin in order to denote certain information concerning the cotton bale, such as the name and location of the gin, the gin code number, a gin bale number to denote the ownership of the producer or grower, and to record certain desired information with relation to the particular bale of cotton as it is processed through the various stages of shipping, compressing, etc.

A cotton bale tag is customarily composed of fibrous material such as cloth or paper, and has severable sections, usually attached by perforations, each section having corresponding gin and bale number identifications thereon, a typical one being shown in connection with the improvement described hereinafter.

It has also been the custom to attach a permanent fireproof metal tag to each bale of cotton, having a number thereon corresponding to the paper tag number. The metal tag is usually attached to the cotton bale by slipping it over one of the steel bands which extend about the bale, such metal tag being attached at the time of compression of the bale of cotton at the gin and before it is removed from the press.

It has been the custom to provide a separate stack of metal tags and a separate bundle of paper tags. Oftentimes the metal tags are stuck together which causes the operator to apply two metal tags in one operation, or he may even neglect to attach a metal tag to correspond with the paper tag attached to the bale.

If the bale is moved from the weighing area at the gin either with two metal tags thereon or with no metal tag thereon to correspond with the paper tag, then every bale following will not have a corresponding metal and paper tag identification, and if such situation is not immediately detected and corrected considerable confusion and extra effort is caused in order to correct the mistake and may even result in loss of a bale or bales of cotton which has to be made good by the gin owner.

The present invention is intended to correct the above described shortcomings of previous practice, and to assure that each bale of cotton ginned will have a correspondingly numbered metal and paper tag thereon when it is moved from the press and weighing area.

In carrying out the invention the metal tag, having an identification number thereon corresponding to those on the paper tag is severably attached to the paper tag so that it is virtually impossible for the operator to place non-corresponding metal and paper tags on a bale of cotton, inasmuch as the metal and paper tags are attached together when they are picked up for placing on the bale of cotton, may be placed on simultaneously, and it would be virtually impossible to place two metal tags on a bale of cotton as in the past or to fail to place the metal tag thereon at the time the paper tag is attached or vice versa. The metal tag and the paper tag may be placed on the bale as a unit, or the metal tag may be severed from the paper tag at the time of placing the tags thereon, so that they can be placed in different positions on the bale.

Other and further objects of the invention will become apparent upon reading the detailed specification hereinafter following and by referring to the drawing annexed hereto.

A suitable embodiment of the invention is shown in the attached drawings wherein:

FIGURE I is a fragmentary top view of a bale of cotton with metal bands thereabout, showing the metal identification tag attached to the band, with the severable paper tag attached thereto;

FIGURE II is a top plan view of the improved combination paper and metal identification tag;

FIGURE III is an edge elevational view of the improved combination paper and metal tag;

FIGURE IV is a fragmentary top perspective view showing the severable metal identification tag attached to the paper tag;

FIGURE V is a fragmentary top plan view of a modified form showing another means for severably attaching the metal identification tag to the paper tag;

FIGURE VI is a transverse sectional view taken along the line VI—VI of FIGURE V.

Numeral references are employed to designate the various parts shown in the drawings and like numerals indicate like parts throughout the various figures of the drawings.

Numeral 1 indicates a cotton bale which has bagging of fibrous material thereabout and is encircled by steel bands 2 drawn tightly thereabout.

A pliable, paper, cloth or plastic tag is generally indicated at 3, and will for convenience be referred to hereinafter as a "paper tag."

The paper tag 3 is comprised of severable sections attached together by perforations. The base section 4 has a wire 20 attached thereto which may be passed through the bagging about the bale for securing same thereto.

Other severable sections of the tag 3 are indicated at 7, 9, and 10, same being severably attached to each other by means of perforations 8, 10a, and 11.

The separate severable sections of the tag have corresponding bale identification numerals 5 and gin identification numerals 6 thereon which correspond. The severable sections are severed from the tag at various stages of the movement and processing of the bale of cotton. For instance, the portion 7 would be torn off to go with the cotton sample for grading by the U.S. Department of Agriculture. The other sections 9 and 10 would be torn off, for instance, to go with the bill of lading when the cotton bale is shipped and as an identification at the cotton compress.

An additional severable section 13 is attached by perforation 13a to the section 7, and also has corresponding bale and gin identification numbers thereon.

A tag 14, made of rigid material, such as metal, is shaped to provide a raised portion 15 to provide horizontally aligned openings 16 through which the metal band 2 may extend in order to secure same to the bale of cotton. Tag 14 will be hereinafter referred to for convenience as a "metal tag."

Heretofore such metal tags have been separately handled and attached to the bale of cotton, but in the disclosure hereof, the metal tag is severably attached to the paper tag by a brad 21, or other suitable means, so that the two tags are handled together, thus eliminating the possibility that correspondingly numbered metal and paper tags will not be placed upon the individual bale of cotton.

The entire unit, consisting of the paper tag 3 and the severable metal tag 14 is normally handled together. They may be placed upon the bale of cotton initially by extending one of the bands 2 through the slots 16 with the paper tag 3 attached thereto. After the bale is pressed and tied together in the manner shown in FIGURE I, the paper tag 3 may be severed from the portion 13 and tied to the bagging at another location or at the same location where it is initially attached. In any event, the two tags, the metal tag 14 and paper tag 3, are placed upon the bale together. However, it should be understood that the metal tag 14 could be severed from the paper tag prior to placing same upon the bale of cotton. The important point is that the metal tag and paper tag are attached together and are handled as a unit immediately prior to attaching same to the bale of cotton so as to eliminate the possibility of placing non-correspondingly numbered metal tags and paper tags on an individual bale of cotton.

Various other means of severably attaching the metal tag 14 to the paper tag 3 may be provided.

For instance, in the modification shown in FIGURE V a severable extension to the paper tag 3, indicated at 17, is attached to the paper tag 3 by means of perforation 17a.

The slots 18 are cut in opposite edges of the severable extension 17 to provide tabs 19. The tabs may be deflected upwardly to pass through the passages 16 of the metal tag 14 and then bent down over the ends of the metal tag, to thereby removably attach the metal tag 14 to the paper tag 3.

Other and further means for attachment of the metal tag to the paper tag may be provided such as by staples, brads, wire, tape, glue, mucilage, etc.

It will be seen that I have provided an improvement in identification tags, and particularly cotton bale identification tags, wherein the possibility of placing non-correspondingly numbered paper and metal tags on the bale of cotton have been virtually eliminated by severably attaching the metal identification tag to the paper tag so that they may be handled as an integral unit and placed upon the bale of cotton either together or may be severed and attached at the time the bale is pressed.

It will be understood that other and further embodiments of the invention may be made and still remain within the spirit and scope of the appended claims.

Having described my invention, I claim:

1. A cotton bale or the like identification tag comprising, a pliable tag comprised of a plurality of sections severably attached together; means for attaching the pliable tag to a bale of cotton; a rigid tag having a raised central section with aligned passages through the ends thereof arranged to receive a bale tie band; and means for severably attaching the rigid tag to the pliable tag; the said sections and rigid tag having corresponding identification numerals thereon.

2. The combination called for in claim 1 wherein the means of attachment of the rigid tag to the paper tag consists of tabs on opposite edges of the pliable tag arranged to be deflected through the passages.

3. The combination called for in claim 1 wherein the tabs are provided on opposite edges of an end section of the pliable tag.

4. An identification tag comprising, a pliable tag comprised of a plurality of sections severably connected together; means for attaching the pliable tag to an article to be identified; a rigid tag comprised of a substantially flat body having a central portion disposed on a different plane from the end portions, with aligned passages provided between the end and central portions; means to severably attach the rigid tag to the pliable tag; the said sections and the rigid tag having corresponding identification numbers thereon.

5. The combination called for in claim 4 wherein the means to severably attach the rigid tag to the pliable tag comprises tabs on opposite edges of the pliable tag which are arranged to be deflected to pass through the passages.

References Cited by the Examiner

UNITED STATES PATENTS

| 231,277 | 8/1880 | Cohen | 40—305 X |
| 1,226,050 | 5/1917 | Barnes | 40—27 |
| 1,458,444 | 6/1923 | Scott | 40—27 X |

EUGENE R. CAPOZIO, *Primary Examiner.*

W. GRIEB, *Assistant Examiner.*